US012474966B2

(12) United States Patent
Jain et al.

(10) Patent No.: US 12,474,966 B2
(45) Date of Patent: Nov. 18, 2025

(54) DYNAMICALLY PERFORMING A STORAGE SERVICE JOB WORKFLOW

(71) Applicant: Cohesity, Inc., San Jose, CA (US)

(72) Inventors: Sachin Jain, Fremont, CA (US); Himanshu Mehra, Mountain View, CA (US); Sashikanth Madduri, Mountain View, CA (US); Apurv Gupta, Bangalore (IN)

(73) Assignee: Cohesity, Inc., Santa Clara, CA (US)

( * ) Notice: Subject to any disclaimer, the term of this patent is extended or adjusted under 35 U.S.C. 154(b) by 596 days.

(21) Appl. No.: 17/501,627

(22) Filed: Oct. 14, 2021

(65) Prior Publication Data

US 2023/0123568 A1 Apr. 20, 2023

(51) Int. Cl.
*G06F 9/50* (2006.01)

(52) U.S. Cl.
CPC .......... *G06F 9/5038* (2013.01); *G06F 9/5016* (2013.01); *G06F 9/5022* (2013.01)

(58) Field of Classification Search
CPC ..... G06F 9/5038; G06F 9/5016; G06F 9/5022
See application file for complete search history.

(56) References Cited

U.S. PATENT DOCUMENTS

| | | | |
|---|---|---|---|
| 2020/0241754 A1* | 7/2020 | Bett | G06F 3/067 |
| 2022/0350642 A1* | 11/2022 | Poddar | G06F 11/2097 |
| 2022/0398168 A1* | 12/2022 | Singhal | G06F 11/3433 |
| 2023/0034835 A1* | 2/2023 | Reyes | G06F 9/5027 |

\* cited by examiner

*Primary Examiner* — Jacob D Dascomb
(74) *Attorney, Agent, or Firm* — Shumaker & Sieffert, P.A.

(57) ABSTRACT

An indication of a storage service job to be performed is received. A task to be performed for the storage service job is determined. The task is added to a work queue. Execution of one or more tasks in the work queue that includes the task is dynamically managed. Resources are dynamically allocated to one or more virtualization containers that are assigned to execute the one or more tasks in the work queue. An identification of one or more new tasks to be performed for the storage service job is received from one of the virtualization containers executing the task. The one or more new tasks are added to the work queue.

19 Claims, 5 Drawing Sheets

DYNAMICALLY PERFORMING A STORAGE SERVICE JOB WORKFLOW

BACKGROUND OF THE INVENTION

Containerized applications may be used to perform a storage service job (e.g., backup, restore, replication, migration, etc.). A storage service provider may specify a static workflow that defines how the storage service job is to be performed. However, storage service jobs are not identical. As a result, a storage service provider may need to specify different static workflows to handle different types of storage service jobs. This can become cumbersome when providing storage service jobs for a plurality of different entities (e.g., individuals, users, companies, enterprises, governments, organizations, etc.).

BRIEF DESCRIPTION OF THE DRAWINGS

Various embodiments of the invention are disclosed in the following detailed description and the accompanying drawings.

DETAILED DESCRIPTION

Techniques to dynamically perform a storage service job workflow are disclosed herein. The techniques disclosed herein enable a storage service job to be performed without explicitly defining a static workflow for a storage service job. This flexibility also allows the storage service job to be performed without adversely impacting a performance of the storage system. Examples of a storage service job may include backup, restore, migration, replication, tiering, disaster recovery, etc. An indication of a storage service job to be performed is received. The indication may be received from a source system or an external device (e.g., a client device). The indication of the storage service job to be performed may specify a task group comprised of a logical group of tasks, a task identifier (e.g., universally unique identifier (UUID) associated with the task), a task type, one or more arguments (e.g., IP address, credentials, etc.) for the task, one or more constraints for the task, and/or resources needed to perform the task.

In response to receiving the indication, the storage system is configured to create a task group comprised of one or more of tasks. A storage service associated with the storage system (e.g., backup service, restore service, migration service, replication service, tiering service, disaster recover service, etc.) submits to a work queue service associated with the storage system a first task of the task group. The order in which the tasks included in the task group are to be performed is not specified by the indication. The storage service job may be comprised of a plurality of stages, each stage associated with a corresponding task group. The order in which the plurality of stages associated the storage service job are performed is also not specified by the indication (e.g., a first stage is generating a snapshot and a second stage is copying data included in the snapshot). Rather, the order is dynamically determined as the storage service job is being performed.

The work queue service maintains a mapping that associates a task type with a particular type of virtualization container. The work queue service includes an orchestrator that is configured to determine a particular virtualization container to perform the first task based on the indication. The orchestrator deploys a computing unit (e.g., a pod) that includes the determined virtualization container to perform the first task. In some embodiments, the orchestrator deploys a computing unit that includes a plurality of virtualization containers to perform the first task.

The storage system is comprised of a plurality of storage nodes. The orchestrator may deploy the computing unit to any of the storage nodes. The orchestrator may select which of the storage nodes to deploy the computing unit based on one or more factors, such as resource availability of a storage node, resource requirements for the task, network latency, load on a storage node, etc. A computing unit is the smallest deployable object to run a single instance of a task. Virtualization containers included in a computing unit share resources and a local network associated with the computing unit. In some embodiments, replica computing units are deployed to perform a task.

A virtualization container associated with a computing unit is not configured to perform the entire storage service job. Rather, the virtualization container may be configured to perform one of many tasks needed to complete the storage service job. For example, a virtualization container associated with the first task may be configured to initiate a backup of a virtual machine on an external device by causing the external device to generate a snapshot of the virtual machine. One or more other virtualization containers may be configured to perform different tasks needed to complete the storage service job. For example, a second virtualization container associated with a second task may be configured to copy data included in the snapshot.

In some embodiments, a virtualization container is associated with a container image specific to the type of task to be performed. As a result, the computing unit that includes the virtualization container is configured to perform the specific task. In some embodiments, a computing unit includes a single virtualization container. In some embodiments, a computing unit includes a plurality of virtualization containers. In some embodiments, each of the plurality of virtualization containers is configured to perform a different type of task. In some embodiments, a virtualization container is associated with a common container image that can handle different tasks. As a result, the computing unit that includes the virtualization container may be re-used. The computing unit may be re-used to perform many tasks of the same or different type. This may reduce costs when a plurality of small tasks or sub-tasks need to be performed because a container does not need to be created and deployed each time a small task or sub-task needs to be performed. The work queue service may assign a plurality of different tasks or sub-tasks to such a virtualization container. For example, after a virtualization container finishes an initial task, the work queue service may assign another task to the virtualization container instead of terminating the virtualization container.

Before the virtualization container included in a computing unit can perform the first task, the work queue service requests resources to perform the first task from a resource manager associated with the storage system. A requested resource may include compute resources, network resources, CPU resources, memory resources, external device CPU resources (e.g., slot resources) file system operation resources (e.g., resources reserved to store data in storage), etc. Each of the requested resources may have a corresponding Quality of Service (QoS) requirement. The storage system may not have resources available to perform a task because the requested resources are being used by one or more other tasks associated with one or more other task groups and/or unavailable from a source system providing resources associated with the task.

The resource manager may allocate resources between tasks associated with the different task groups using a resource allocation algorithm. In some embodiments, the resource allocation algorithm is a fairness algorithm. For example, a round-robin algorithm may be used. In some embodiments, the resource allocation algorithm is a weighted algorithm. For example, weights are assigned to the different task groups and resources are allocated between tasks associated with the different task groups based on the assigned weights.

The resource manager is configured to withhold resources for a particular task, such as the first task, until at least a minimum of the requested resources needed to make progress on the particular task are available. A threshold indicating the minimum required resources sufficient to make progress for a task may be manually or automatically configured or dynamically determined at the execution based on conditions at the time of execution. Partially allocating the requested resources below the minimum requested resources for a particular task is a waste of time and resources because the container assigned to perform the particular task is unable to make progress on the task without the minimum requested resources. Furthermore, one or more other tasks may be unable to be performed because the resources needed to perform the one or more other tasks have been partially allocated to the particular task.

The work queue service is configured to schedule the first task when the resource manager is able to allocate at least the minimum of the requested resources needed to make progress on the first task. This ensures that resources are allocated when they will actually be used to perform the first task. In response to the requested resources being allocated, the virtualization container associated with the first task can initiate the first task. The virtualization container associated with the first task may checkpoint an intermediate state of the first task at any point in time while the first task is being performed. This enables the first task to be resumed from the intermediate state instead of restarting the first task from its initial state in the event the first task fails or is suspended before completion.

The computing unit associated with the first task is configured to provide a heartbeat signal to the work queue service while the first task is being performed. The work queue service may determine a failure in the event the heartbeat signal is not received within a threshold amount of time since a previous heartbeat signal. In the event the work queue service detects a failure, the work queue service may reassign the first task to another computing unit. The virtualization container included in the other computing unit may resume the first task from the checkpointed state. In some embodiments, the work queue service deploys the other computing unit to resume the first task after detecting the failure. In some embodiments, the other computing unit has already been deployed and is assigned to resume the first task.

In some embodiments, the virtualization container associated with the first task performs the first task without dividing the first task into a plurality of sub-tasks. The virtualization container associated with the first task may determine one or more new tasks to be performed for the storage service job while the first task is being performed. The virtualization container associated with the first task may be configured to select one or more new task types to be performed from a plurality of pre-programmed task types based on conditions associated with executing the first task (e.g., data change rate, load on external source system depth of directory tree structure on source system, amount of data associated with a storage service job, number of files, amount of changes, etc.). The task types that are available for the virtualization container to select depend on the particular type of task that the virtualization container is configured to perform. For example, a first virtualization container performing a first type of task may be configured to select one or more new task types from a first set of task types and a second virtualization container performing a second type of task may be configured to select one or more new task types from a second set of task types. The task types included in the first and second set of task types may or may not overlap.

The one or more new task types are a different type of task than the first task. For example, the first task may be generating a snapshot of a source system and a new task may be copying data included in the snapshot. The virtualization container associated with the first task may send to the work queue service a request to add one or more new tasks to the work queue. The request may identify the task type and include the required resources for each of the one or more new tasks. The one or more new tasks may be of the same or different type. For example, the virtualization container associated with the first task may determine that 20 data copying tasks need to be performed for the storage service job. The work queue service provides the request to the resource manager and deploys a computing unit that includes a virtualization unit corresponding to the identified task type. The one or more new tasks may start when the resource manager allocates at least the minimum of the requested resources needed to make progress on one or more new tasks.

In some embodiments, the one or more new tasks are performed in parallel with the first task. The first task may be a parent task for the one or more new tasks. The work queue may generate a hierarchical task tree that maintains the relationship between a task and the one or more new tasks. The virtualization container associated with the first task may receive from the work queue service a notification when the one or more new tasks have been completed. In some embodiments, the one or more new tasks are performed after the first task has been completed. Upon completing the first task, the virtualization container associated with the first task may checkpoint an intermediate state and send to the work queue service an indication that the first task is completed and a result of the first task being completed.

In some embodiments, the virtualization container associated with the first task determines to divide the first task into a plurality of sub-tasks. The first task may be divided into a plurality of sub-tasks at any point in time while the first task is being performed. In some embodiments, one or more factors (e.g., data change rate, load on external source system, depth of directory tree structure on source system, amount of data associated with a storage service job, number of files, amount of changes, etc.) cause the virtualization container associated with the first task to divide the first task into the plurality of sub-tasks.

Before the plurality of sub-tasks associated with the first task can be performed, the virtualization container associated with the first task submits to the work queue service a request for resources for the plurality of sub-tasks. The request identifies the resource requirements for each of the plurality of sub-tasks. In response, the work queue service adds the plurality of sub-tasks to a work queue and submits to the resource manager a request for resources for the plurality of sub-tasks.

The resource manager may determine whether or not to allocate the requested resources to the plurality of sub-tasks associated with the first task. In the event the resource manager is unable to allocate resources for at least some of the sub-tasks associated with first task, an intermediate state associated with the first task is checkpointed and resources allocated to perform the first task are de-allocated. The first task is resumed from the checkpoint state when the resource manager can allocate resources for the sub-tasks associated with the task.

In the event the resource manager is able to allocate resources for at least some of the sub-tasks associated with the first task, the work queue service deploys one or more computing units comprised of a corresponding virtualization container to perform each of the sub-tasks, schedules each of the sub-tasks to be performed, and generates a hierarchical task tree that maintains the relationship between a task and its associated sub-tasks. The plurality of sub-tasks may be performed in parallel and/or in sequence. The virtualization container associated with the first task may provide a corresponding input to each of the virtualization containers associated with the plurality of sub-tasks.

In some embodiments, the virtualization container associated with a sub-task completes the sub-task on its own. In some embodiments, the virtualization container associated with a sub-task completes an assigned sub-task by dividing the assigned sub-task into a plurality of smaller sub-tasks. Any of the virtualization containers associated with sub-tasks of a task may independently determine to divide its sub-task into a plurality of sub-tasks. The hierarchical task tree associated with a task may be comprised of n levels, where a first level corresponds to the task, a second level corresponds to a plurality of sub-tasks associated with the task, . . . , and an nth level corresponds to a plurality of sub-tasks associated with the (n−1)th sub-task.

Similar to the virtualization container associated with the first task, the virtualization container associated with each of the plurality of sub-tasks may checkpoint an intermediate state of a corresponding sub-task at any point in time while the corresponding sub-task is being performed and are configured to provide a corresponding heartbeat signal to the work queue service while a corresponding sub-task is being performed. The work queue service may determine a failure for a sub-task in the event the heartbeat signal is not received from the computing unit that includes the virtualization container associated with the sub-task within a threshold amount of time since a previous heartbeat signal. In the event the work queue service detects a failure, the work queue service may reassign the sub-task to another computing unit. A virtualization container included in the other computing unit may resume the sub-task from a checkpointed state.

The first task may be canceled before completion. In some embodiments, the first task is canceled by a user associated with a source system or external device. In some embodiments, the first task is canceled in the event the first task and/or the sub-tasks associated with the first task fail more than a threshold number of times. Canceling the first task not only cancels the first task, but also any sub-tasks associated with the first task. In response to the first task being canceled, the work queue service utilizes the hierarchical task tree to de-allocate the resources allocated to the first task and any sub-tasks that are directly or indirectly associated with the first task.

Upon completing a sub-task, the virtualization container associated with the sub-task may checkpoint an intermediate state and send to the work queue service an indication that the sub-task is completed. In response to all of the sub-tasks associated with the first task being completed, the work queue service is configured to provide a notification to the virtualization container associated with the first task. In response, the virtualization container associated with the first task is configured to provide a result of the first task to the work queue service.

Unlike other systems that perform static workflows where the sequence of task types is predefined, the one or more new task types (e.g., snapshot, data copy) to be performed for the storage service job are not known a priori. The virtualization container associated with the task may determine one or more new task types to be performed for the storage service job while the task is being performed. The virtualization container associated with the task may be configured to select one or more task types of a plurality of pre-configured task types based on conditions associated with executing the task (e.g., data change rate, load on external source system, depth of directory tree structure on source system, amount of data associated with a storage service job, number of files, amount of changes, etc.). The task types available to select depends on the task associated with a virtualization container.

The virtualization container associated with a task may send to the work queue service a request to add one or more new tasks to the work queue. The request may identify the task type and include the required resources for each of the one or more new tasks. An orchestrator of the work queue service utilizes the received task type(s) in conjunction with the mapping to determine a particular virtualization container to perform each of the one or more new tasks. In some embodiments, the orchestrator deploys a new computing unit that includes the determined virtualization container to perform the new task. In some embodiments, the orchestrator reconfigures a virtualization container included in a computing unit associated with a previous task to perform the new task.

The framework to perform a new task is the same as the framework to perform the first task as described above. The work queue service requests resources for a new task from the resource manager. The resource manager is configured to allocate the requested resources to the virtualization container associated with the task when at least minimum of the requested resources needed to make progress on the new task can be allocated. The work queue service is configured to schedule a new task when at least the minimum of the requested resources needed to make progress on the new task can be allocated. After the requested resources are allocated, the virtualization container performs the new task. In some embodiments, a new task fails or is suspended before completion. In some embodiments, a new task is canceled before completion. In some embodiments, a new task is completed. In some embodiments, the virtualization container associated with the new task completes the new task without dividing the new task into a plurality of sub-tasks. In some embodiments, the virtualization container associated with the new task completes the new task by dividing the new task into a plurality of sub-tasks.

A virtualization container associated with the new task may cause one or more other tasks associated with the storage service to be performed or cause the storage service job to end. In some embodiments, the other task is another task included in the task group. In some embodiments, the other task is a task included in a different task group. The above process repeats until all of the tasks associated with the storage service job have been completed. The work service queue may determine that the storage service job has been completed in response to receiving an output from the virtualization container associated with a last task that indicates that the storage service job has been completed.

Figure 1:
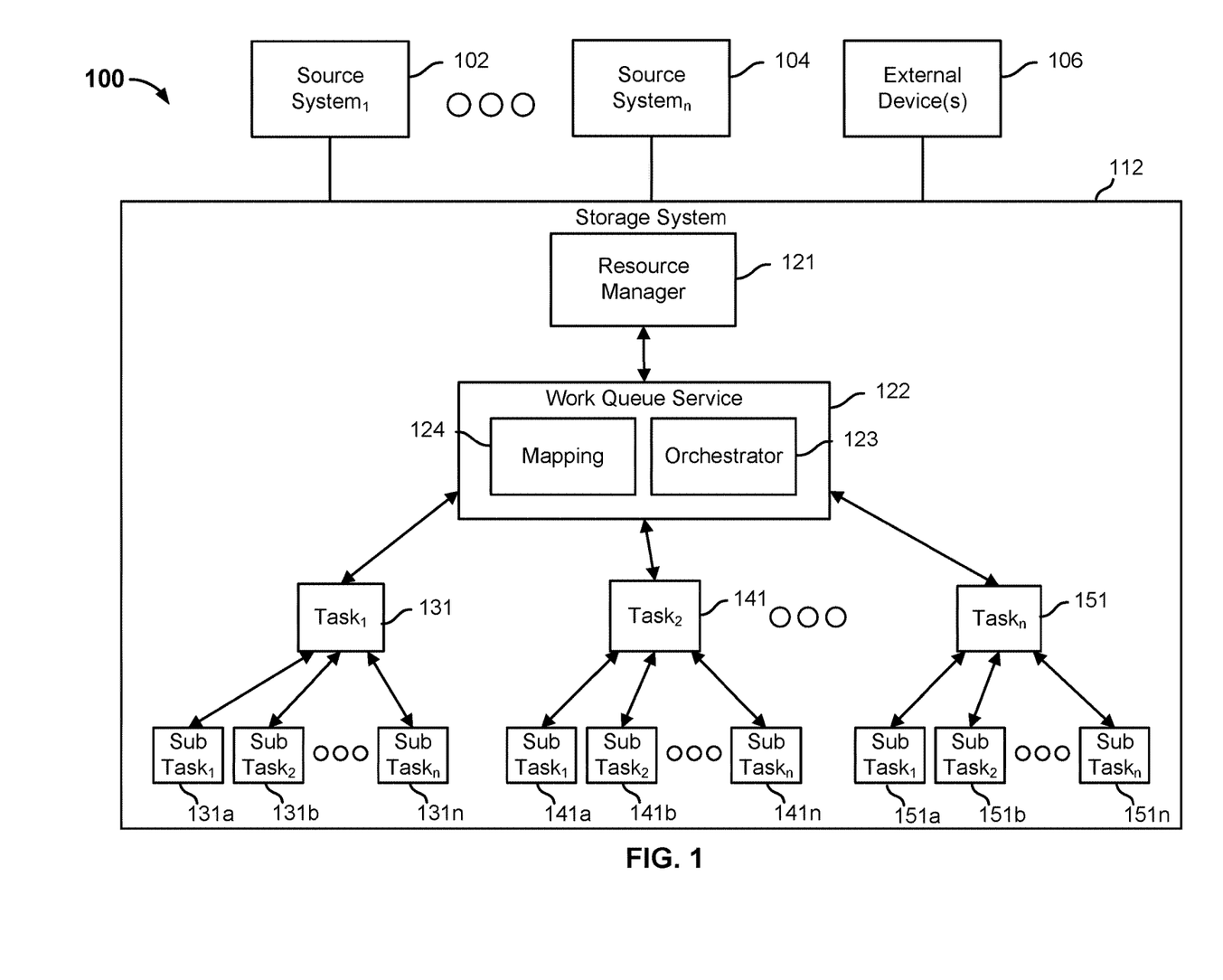
FIG. 1 is a block diagram illustrating an embodiment of a system for dynamically performing a storage service job workflow.

FIG. 1 is a block diagram illustrating an embodiment of a system for dynamically performing a storage service job workflow. In the example shown, system 100 includes source systems 102, 104 and one or more external devices 106 coupled to a storage system 112.

Source systems 102, 104 may be a primary storage system, a server, a virtual machine, a database, and/or a computing device for which a storage service job is to be performed. Although FIG. 1 depicts two source systems, system 100 may include 1:n source systems. In some embodiments, source systems 102, 104 are associated with a single entity (e.g., a user, an enterprise, a government, a company, an organization, a group, etc.). In some embodiments, source system 102 is associated with a first entity and source system 104 is associated with a second entity. In some embodiments, a plurality of entities are associated with one or more corresponding source systems that are coupled to storage system 112.

Storage system 112 may be a server, a computing cluster that includes a plurality of storage nodes, a virtual machine running on a computing device (e.g., a computer), one or more cloud computing devices, etc.

In some embodiments, the storage nodes of storage system 112 are homogenous nodes where each storage node has the same capabilities (e.g., processing, storage, memory, etc.). In some embodiments, at least one of the storage nodes of the secondary storage system is a heterogeneous node with different capabilities (e.g., processing, storage, memory, etc.) than the other storage nodes of secondary storage system.

In some embodiments, a storage node of storage system 112 includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a storage node of storage system 112 includes a processor and memory, and is coupled to a separate storage device. The separate storage device may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the changed objects that were backed up to the secondary storage system. For example, the separate storage device may be segmented into 10 partitions and the secondary storage system may include 10 storage nodes. A storage node of the 10 storage nodes may be allocated one of the 10 partitions.

In some embodiments, a storage node of storage system 112 includes a processor, memory, and a storage device. The storage node may be coupled to a separate storage device. The separate storage device may include one or more storage devices. A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and the secondary storage system may include 10 storage nodes. A storage node of the 10 storage nodes may be allocated one of the 10 partitions.

Storage system 112 may be a cloud instantiation of a storage system. A configuration of cloud instantiation of storage system 112 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of a storage system.

The one or more external devices 106 may be client devices, such as a computer, a laptop, a tablet, a smart device, a desktop, etc.

Storage system 112 may receive an indication of a storage service job to be performed from a source system 102, 104 or an external device 106. Examples of a storage service job may include backup, restore, migration, replication, tiering, disaster recovery, etc. The indication of the storage service job to be performed may specify a task group comprised of a logical group of tasks, a task identifier (e.g., universally unique identifier (UUID) associated with the task), a task type, one or more arguments (e.g., IP address, credentials, etc.) for the task, one or more constraints for the task, and/or resources needed to perform the task.

In response to receiving the indication, storage system 112 is configured to create a task group comprised of one or more tasks that need to be performed for the storage service job. A storage service associated with storage system 112 (e.g., backup service, restore service, migration service, replication service, tiering service, etc.) submits to work queue service 122 a task. The order in which the tasks included in the task group are to be performed is not specified by the indication. The storage service job may be comprised of a plurality of stages, each stage associated with a corresponding task group (e.g., a first stage is generating a snapshot and a second stage is copying data included in the snapshot). The order in which the task groups are performed is also not specified by the indication.

Storage system 112 includes work queue service 122. Work queue service 122 maintains a mapping 124, which associates a task type with a particular type of virtualization container. Each virtualization container is associated with a particular task or a particular subtask.

Storage system 112 includes orchestrator 123. Orchestrator 123 is configured to determine a particular virtualization container to perform a particular task or a particular subtask based on the indication received from source system 102, 104 or a received task type received from a virtualization container associated with a task. Orchestrator 123 is configured to deploy a computing unit that includes a virtualization container to perform a task or subtask to any of the storage nodes of storage system 112. Orchestrator 123 may select which of the storage nodes to deploy the computing unit based on one or more factors, such as resource availability of a node, resource requirements for a task or subtask, network latency, load on a storage node, etc. A virtualization container associated with a computing unit is not configured to perform the entire storage service job. Rather, the virtualization container may be configured to perform one of many tasks or subtasks needed to complete the storage service job.

Orchestrator 123 is configured to deploy one or more sets of one or more computing units to perform one or more corresponding tasks. In the example shown, orchestrator 123 has deployed a first set of one or more computing units to perform a first task 131, a second set of one or more computing units to perform a second task 141, . . . , and an nth set of one or more computing units to perform an nth task 151. Orchestrator 123 may be configured to deploy a set of one or more computing units for a new task after a set of one or more computing units has completed a previous task (e.g., the tasks are performed sequentially). Orchestrator 123 may be configured to deploy multiple sets of one or more computing units to perform corresponding tasks so that the corresponding tasks may be performed in parallel.

In some embodiments, a virtualization container is associated with a container image specific to the type of task to be performed. As a result, the computing unit that includes the virtualization container is configured to perform the specific task.

In some embodiments, a virtualization container is associated with a common container image that can handle different types of tasks. In some embodiments, a virtualization container is associated with a common container image that can handle different types of sub-tasks. As a result, the computing unit that includes the virtualization container may be re-used because a container does not need to be created and deployed each time a small task or sub-task needs to be performed. This may reduce costs when a plurality of small tasks or sub-tasks need to be performed. Work queue service 122 may assign a plurality of different tasks or sub-tasks to a virtualization container.

Before a virtualization container can perform a task or sub-task, work queue service 122 needs to request resources to perform the task or sub-task from resource manager 121. A requested resource may include compute resources, network resources, CPU resources, memory resources, external device CPU resources (e.g., slot resources), file system operation resources (e.g., resources reserved to store data in storage), etc. Each of the requested resources may have a corresponding QoS requirement. Storage system 112 may not have resources available to perform a task or sub-task because the requested resources are being used by one or more other tasks associated with the task group or one or more other tasks associated with one or more other task groups, and/or unavailable from a source system providing resources associated with the task. Resource manager 121 may allocate resources between tasks using a resource allocation algorithm. In some embodiments, the resource allocation algorithm is a fairness algorithm. For example, a round-robin algorithm may be used. In some embodiments, the resource algorithm is a weighted algorithm. For example, weights are assigned to the different task groups and resources are allocated between tasks associated with the different task groups based on the assigned weights.

Resource manager 121 is configured to withhold resources for a particular task or sub-task until at least a minimum of the requested resources needed to make progress on the particular task or sub-task are available. Work queue service 122 is configured to schedule a particular task or sub-task when resource manager 121 is able to allocate all the requested resources associated with the particular task or sub-task.

In response to the requested resources being allocated, the virtualization container associated with a particular task or sub-task can initiate the particular task or sub-task. The virtualization container associated with the particular task or sub-task may checkpoint an intermediate state of the particular task or sub-task at any point in time while the particular task or sub-task is being performed. This enables the particular task or sub-task to be resumed from the intermediate state instead of restarting the particular task or sub-task task from its initial state in the event the particular task or sub-task fails or is suspended before completion.

The computing unit associated with a particular task or sub-task is configured to provide a heartbeat signal to work queue service 122 while the particular task or sub-task is being performed. Work queue service 122 may determine a failure in the event the heartbeat signal is not received within a threshold amount of time since a previous heartbeat signal. In the event work queue service 122 detects a failure, work queue service 122 may reassign the particular task or sub-task to another computing unit. The other computing unit may resume the particular task or sub-task from the checkpointed state.

In some embodiments, the virtualization container associated with a particular task completes the particular task without dividing the particular task into a plurality of sub-tasks. The virtualization container associated with a task may determine one or more new tasks to be performed for the storage service job while the task is being performed. The virtualization container associated with the task may be programmed to select one or more task types of a plurality of pre-programmed task types based on conditions associated with executing the task (e.g., data change rate, load on external source system depth of directory tree structure on source system, amount of data associated with a storage service job, number of files, amount of changes, etc.). The one or more new task types are a different task type than the task being. The virtualization container associated with the task may send to work queue service 122 a request to add one or more new tasks to the work queue. The request may identify the task type and include the required resources for each of the one or more new tasks. Work queue service 122 provides the request to resource manager 121 and deploys a computing unit that includes a virtualization unit corresponding to the identified task type. The one or more new tasks may start when resource manager 121 allocates at least the minimum of the requested resources needed to make progress on the one or more new tasks.

Upon completing the particular task, the virtualization container associated with the particular task may checkpoint an intermediate state and send to work queue service 122 an indication that the particular task is completed and a result of the particular task being completed.

In some embodiments, the virtualization container associated with a particular first task determines to divide the particular task into a plurality of sub-tasks. A particular task may be divided into a plurality of sub-tasks at any point in time while the particular task is being performed. In some embodiments, one or more factors (e.g., data change rate, load on external system, depth of directory tree structure on external system, amount of data associated with a storage service job, number of files, amount of changes, etc.) cause the one of the one or more virtualization containers associated with the particular task to divide the particular task into the plurality of sub-tasks.

In the example shown, the one or more virtualization containers associated with tasks 131, 141, 151 may independently determine to divide an assigned task into a plurality of sub-tasks. In the example shown, the one or more virtualization containers associated with task 131 has divided task 131 into sub-tasks 131*a*, 131*b*, . . . , 131*n*. The one or more virtualization containers associated with task 141 has divided task 141 into sub-tasks 141*a*, 141*b*, . . . , 141*n*. The one or more virtualization containers associated with task 151 has divided task 151 into sub-tasks 151*a*, 151*b*, . . . , 151*n*. The one or more virtualization containers s) associated with a task may determine to divide the task into 2:n sub-tasks.

Before the plurality of sub-tasks associated with the particular task can be performed, the virtualization container associated with the particular task submits to work queue service 122 a request for resources for the plurality of sub-tasks. The request identifies the resource requirements for each of the plurality of sub-tasks. In response, work queue service 122 adds the plurality of sub-tasks to a work queue and submits to resource manager 121 a request for resources for the plurality of sub-tasks. In the event resource manager 121 is unable to allocate resources for at least some of the sub-tasks associated with particular task, an intermediate state associated with the particular task is checkpointed and resources allocated to perform the particular task are de-allocated (e.g., the computing unit(s) associated with the particular task are torn down). The particular task is resumed from the checkpoint state when the resource manager can allocate resources for at least some of the sub-tasks associated with the particular task.

In the event resource manager 121 can allocate resources for at least some of the sub-tasks associated with the particular task, work queue service 122 deploys one or more computing units comprised of corresponding virtualization containers to perform each of the sub-tasks, schedules each of the sub-tasks to be performed, and generates a hierarchical task tree between the particular task and the sub-tasks. The hierarchical task tree maintains the relationship between a particular task and its associated sub-tasks. The plurality of sub-tasks of the particular task may be performed in parallel or in sequence. A virtualization container associated with the particular task may provide a corresponding input to a virtualization container associated with the plurality of sub-tasks. A hierarchical task tree may be maintained between a task and one or more new tasks.

A particular task may be canceled before completion. In some embodiments, the particular task is canceled by a user associated with a source system 102, 104 or external device 106. In some embodiments, the particular task is canceled by event analysis system 112 in the event the particular task and/or the sub-tasks associated with the particular task fail more than a threshold number of times. Canceling the particular task not only cancels the first task, but also any sub-tasks associated with the particular task. In response to the particular task being canceled, work queue service 122 utilizes the hierarchical task tree to release the resources allocated to the particular task and any sub-tasks that are directly or indirectly associated with the particular task. In some embodiments, in response to a particular task being canceled, work queue service 122 utilizes the hierarchical task tree to release the resources allocated to the particular task and any new tasks that are directly or indirectly associated with the particular task.

Upon completing a sub-task, the virtualization container associated with the sub-task may checkpoint an intermediate state and send to work queue service 122 an indication that the sub-task is completed. In response to all of the sub-tasks associated with a particular task being completed, work queue service 122 is configured to provide a notification to the virtualization container associated with the particular task. In response, the virtualization container associated with the particular task is configured to provide to work queue service 122 a result of the particular task. In some embodiments, the result indicates that a storage service job has completed.

In some embodiments, a plurality of different storage service jobs associated with a plurality of different entities are being concurrently performed. Resource manager 121 may allocate resources between tasks associated with the different entities using a resource allocation algorithm. In some embodiments, a fairness algorithm is used. For example, a round-robin algorithm may be used. In some embodiments, a weighted algorithm is sued. For example, weights are assigned to the different entities and resources are allocated between tasks associated with the different entities based on the assigned weights. A provider of storage system 112 may have QoS standards for one or more storage service jobs. Allocating resources between tasks associated with different entities using a fairness algorithm or based on a weighted function may enable storage system to satisfy QoS standards when concurrently performing a plurality of different storage service jobs.

Figure 2:
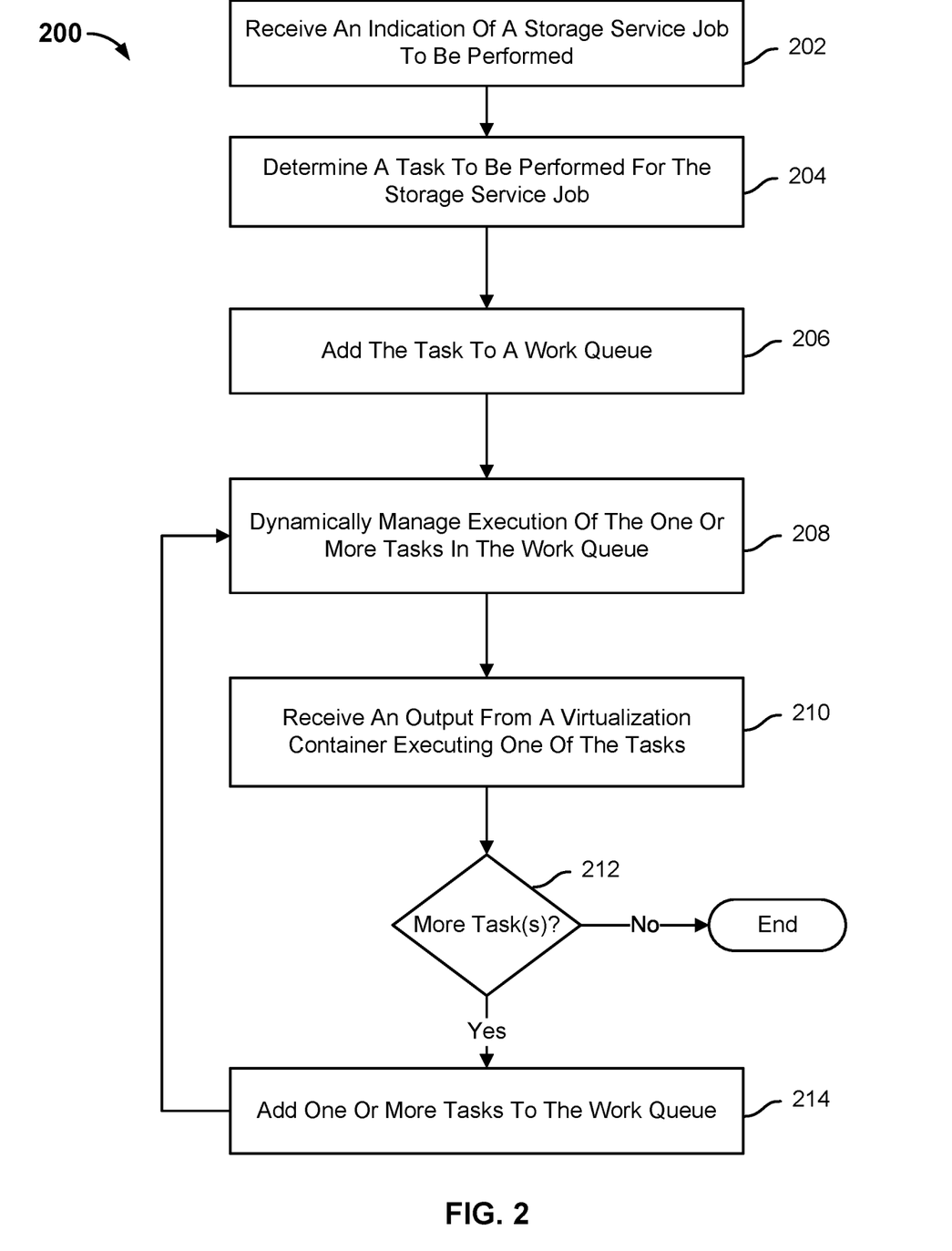
FIG. 2 is a flow diagram illustrating an embodiment of a process for dynamically performing a storage service job workflow.

FIG. 2 is a flow diagram illustrating an embodiment of a process for dynamically performing a storage service job workflow. In the example shown, process 200 may be implemented by a storage system, such as storage system 112.

At 202, an indication of a storage service job to be performed is received. The indication may be received from a source system or an external device (e.g., a client device). Examples of a storage service job may include backup, restore, migration, replication, tiering, etc.

The indication of the storage service job to be performed may specify a task group comprised of a logical group of tasks, a task identifier (e.g., universally unique identifier (UUID) associated with the task), a task type, one or more arguments (e.g., IP address, credentials, etc.) for the task, one or more constraints for the task, and/or resources needed to perform the task.

At 204, a task to be performed for the storage service job is determined. In response to receiving the indication, the storage system is configured to create for the storage service job a task group comprised of one or more tasks. A storage service associated with the storage system (e.g., backup service, restore service, migration service, replication service, tiering service, disaster recovery service, etc.) submits one of the tasks to a work queue service associated with the storage system. The order in which the tasks included in the task group are to be performed is not specified by the indication.

The work queue service maintains a mapping that associates a task type with a particular type of virtualization container. Each virtualization container is associated with a particular task. The work queue service includes an orchestrator that is configured to determine a particular virtualization container to perform a task based on the indication.

At 206, the task is added to a work queue. The orchestrator deploys a computing unit that includes the determined virtualization container to perform the task and adds the task to a work queue. In some embodiments, replica computing units are deployed to perform the task. In some embodiments, the computing unit includes a plurality of virtualization containers. Before the task can be performed, the work queue service sends a request for resources to perform the task to a resource manager associated with the storage system. A requested resource may include compute resources, network resources, CPU resources, memory resources, external device CPU resources (e.g., slot resources) file system operation resources (e.g., resources reserved to store data in storage), etc. Each of the requested resources may have a corresponding QoS requirements.

At 208, execution of one or more tasks in the work queue is dynamically managed. In some embodiments, the task added at 206 is the only task in the work queue. In some embodiments, the task added at 206 is one of a plurality of tasks in the work queue.

Resources may be dynamically allocated to virtualization container(s) that are assigned to execute a task. In response to receiving a request for resources to perform a task, a resource manager of the storage system may determine whether or not to allocate the requested resources.

In some embodiments, the resource manager is unable to allocate resources for a task because the requested resources are being used by one or more other tasks included in the work queue and/or unavailable from a source system providing resources associated with the task. In some embodiments, the resource manager is able to allocate resources for the task. The resource manager may utilize a resource algorithm to determine whether to allocate the requested resources. In some embodiments, a fairness algorithm is used. For example, a round-robin algorithm may be used. The work queue may include tasks associated with different task groups. In some embodiments, a weighted algorithm is used. For example, weights are assigned to the different task groups and resources are allocated between tasks associated with the different task groups based on the assigned weights.

The resource manager is configured to withhold resources for the task until at least a minimum of the requested resources needed to make progress on the task are available. Partially allocating the requested resources for a particular task is a waste of time and resources because the virtualization container assigned to perform the task are unable to make progress on the task without the minimum of the requested resources. Furthermore, one or more other tasks may be unable to be performed because the resources needed to perform the one or more other tasks have been partially allocated to the task.

The work queue service is configured to schedule the task when the resource manager is able to allocate all the requested resources associated with the task. In response to the requested resources being allocated, the virtualization container associated with the task can initiate the task. The virtualization container associated with the task may checkpoint an intermediate state of the task at any point in time while the task is being performed. This enables the task to be resumed from the intermediate state instead of restarting the task from its initial state in the event the task fails or is suspended before completion.

The computing unit associated with the task is configured to provide a heartbeat signal to the work queue service while the task is being performed. The work queue service may determine a failure in the event the heartbeat signal is not received within a threshold amount of time since a previous heartbeat signal. In the event the work queue service detects a failure, the work queue service may dynamically allocate resources by reassigning the task to another computing unit. The resources that were allocated to the failed computing unit are re-allocated to the other computing unit. The virtualization container included in the other computing unit may resume the task from the checkpointed state.

In some embodiments, a task is canceled before completion. In some embodiments, the task is canceled by a user associated with a source system or an external device. In some embodiments, the task is canceled in the event the task fails more than a threshold number of times. In response to the task being canceled, the resource manager may dynamically allocate resources allocated to the task to one or more other tasks in the work queue.

In some embodiments, the virtualization container associated with the task complete the task. Upon completion, the virtualization container associated with the task may checkpoint an intermediate state, and send to the work queue service an indication that the task is completed and a result of the task being completed. In some embodiments, the result indicates that a storage service job has completed.

In some embodiments, the virtualization container associated with the task determines to divide the task into a plurality of sub-tasks. The task may be divided into a plurality of sub-tasks at any point in time while the task is being performed. In some embodiments, one or more factors (e.g., data change rate, load on external system, depth of directory tree structure on external system, etc.) cause the virtualization container associated with the task to divide the task into the plurality of sub-tasks.

Before the plurality of sub-tasks associated with the task can be performed, the virtualization container associated with the task submits to the work queue service a request for resources for the plurality of sub-tasks. The request identifies the resource requirements for each of the plurality of sub-tasks. In response, the work queue service adds the plurality of sub-tasks to a work queue, deploys one or more computing units comprised of corresponding virtualization containers to perform each of the plurality of sub-tasks, and submits to the resource manager a request for resources for the plurality of sub-tasks.

In the event the resource manager is unable to allocate resources for at least some of the sub-tasks associated with task, an intermediate state associated with the task is checkpointed and resources allocated to perform the task are de-allocated (e.g., the computing unit(s) associated with the task are torn down). The resources allocated to perform the task may be re-allocated for one or more other tasks. The task is resumed from the checkpoint state when the resource manager can allocate resources for the sub-tasks associated with the task.

The virtualization container associated with a sub-task may initiate the sub-task in response to the resource manager allocating the requested resources. The work queue service generates a hierarchical task tree that maintains the relationship between the task and its sub-tasks. In some embodiments, the virtualization container associated with a sub-task completes the sub-task on its own. In some embodiments, the virtualization container associated with a sub-task completes the sub-task by dividing the sub-task into a plurality of smaller sub-tasks. The hierarchical task tree may be comprised of n levels, where a first level corresponds to a task, a second level corresponds to a plurality of sub-tasks associated with the task, . . . , and an nth level corresponds to a plurality of sub-tasks associated with the (n−1) to sub-task. The plurality of sub-tasks may be performed in parallel or in sequence. A virtualization container associated with the task may provide a corresponding input to a virtualization container associated with the plurality of sub-tasks. The virtualization container associated with each of the plurality of sub-tasks may checkpoint an intermediate state of a corresponding sub-task at any point in time while the corresponding sub-task is being performed.

The computing unit associated with each of the plurality of sub-tasks is configured to provide a corresponding heartbeat signal to the work queue service while a corresponding sub-task is being performed. The work queue service may determine a failure for a sub-task in the event the heartbeat signal is not received from the computing unit associated with the sub-task within a threshold amount of time since a previous heartbeat signal. In the event the work queue service detects a failure, the work queue service may reassign the sub-task to another computing unit and dynamically allocate resources reserved for the failed computing unit to the other computing unit. The one or more virtualization containers included in the other computing unit may resume the sub-task from a checkpointed state.

In some embodiments, a task is canceled before completion. Canceling the task not only cancels the task, but also any sub-tasks associated with the task. In response to the task being canceled, the work queue service utilizes the hierarchical task tree to release the resources allocated to the task and any sub-tasks that are directly or indirectly associated with the task. Subsequently, the resource manager may dynamically allocate the released resources for one or more other tasks in the work queue.

Upon completing a sub-task, the virtualization container associated with the sub-task may checkpoint an intermediate state and send to the work queue service an indication that the sub-task is completed. In response to all of the sub-tasks associated with the task being completed, the work queue service is configured to provide a notification to the virtualization container associated with the task. In response, the virtualization container associated with the task is configured to provide a result of the task.

At 210, an output is received from one of the virtualization containers executing one of the one or more tasks. In some embodiments, the output identifies one or more task types associated with one or more new task types. The output may identify the required resources associated with each of the one or more new task types. In some embodiments, the output indicates that a storage service job has completed.

A virtualization container associated with the task may determine one or more new tasks to be performed for the storage service job while the task is being performed. The virtualization container associated with the task may be programmed to select one or more task types of a plurality of pre-programmed task types based on conditions associated with executing the task (e.g., data change rate, load on external source system depth of directory tree structure on source system, amount of data associated with a storage service job, number of files, amount of changes, etc.). The one or more new task types are a different type of task than the task being performed.

At 212, it is determined whether the output identifies one or more new task types to be performed for the storage service job.

In the event the output identifies one or more new task types to be performed for the storage service job, process 200 proceeds to 214 where the one or more new tasks corresponding to the one or more new task types are added to the work queue. The work queue service determines a new task to be performed based on the received output. The work queue service maintains a mapping that associates a corresponding task type with a particular type of virtualization container. The work queue service includes an orchestrator that is configured to determine a particular set of one or more containers to perform a new task based on the received output.

In the event the result does not identify one or more new task types to be performed for the storage service job, the storage service job is completed and process 200 ends.

Figure 3:
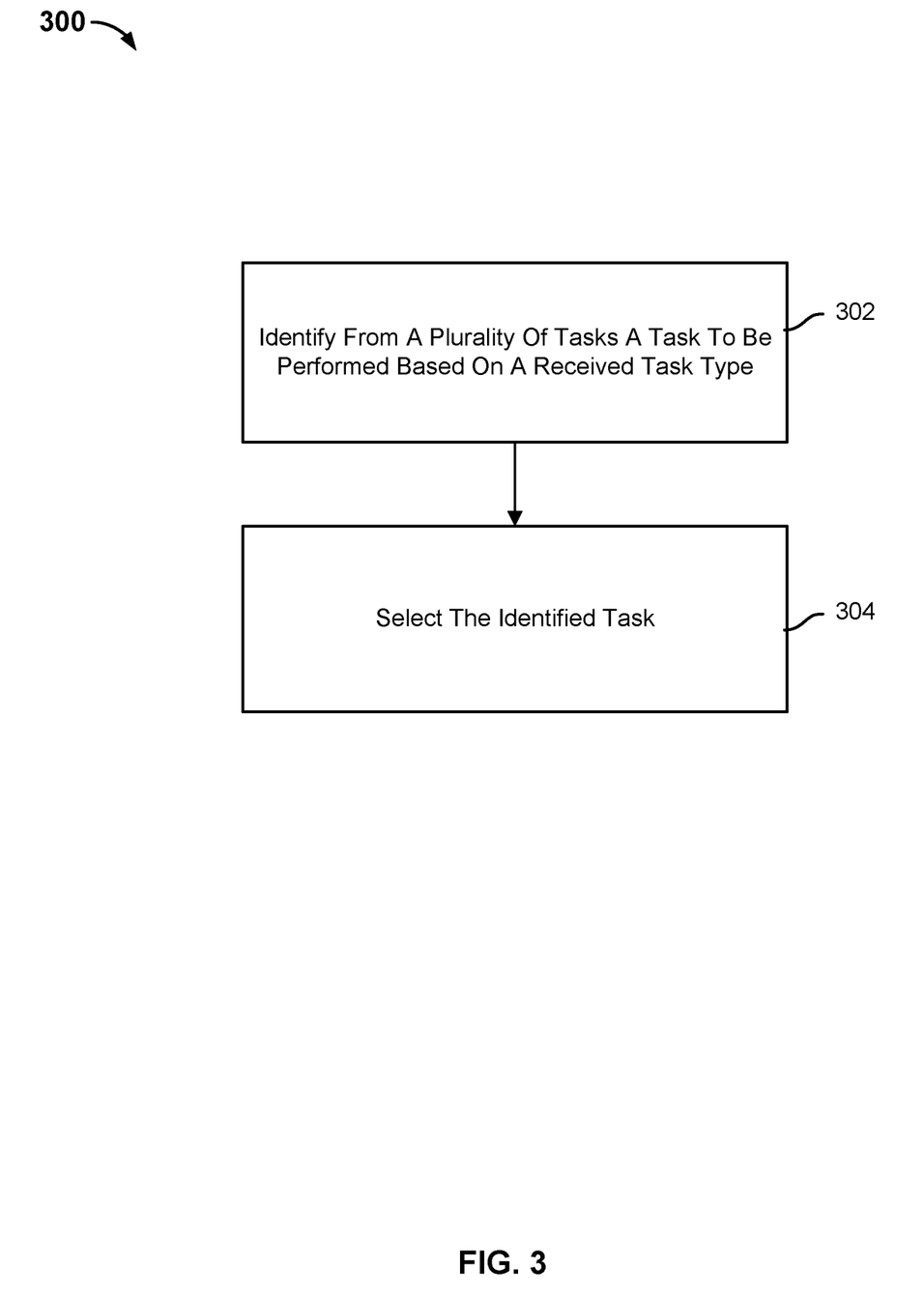
FIG. 3 is a flow diagram illustrating a process for determining a task to be performed for a storage service job in accordance with some embodiments.

FIG. 3 is a flow diagram illustrating a process for determining a task to be performed for a storage service job in accordance with some embodiments. In the example shown, process 300 may be implemented by a storage system, such as storage system 112. In some embodiments, process 300 is implemented to perform some or all of step 204 of process 200.

At 302, a task to be performed is identified from a plurality of tasks based on a received indication that includes a task type. A work queue service maintains a mapping that associates a task type with a particular type of virtualization container. Each virtualization containers is associated with a particular task.

At 304, the identified task is selected to be performed. The work queue service includes an orchestrator that is configured to determine a particular virtualization container to deploy and perform the identified task based on the received indication.

Figure 4:
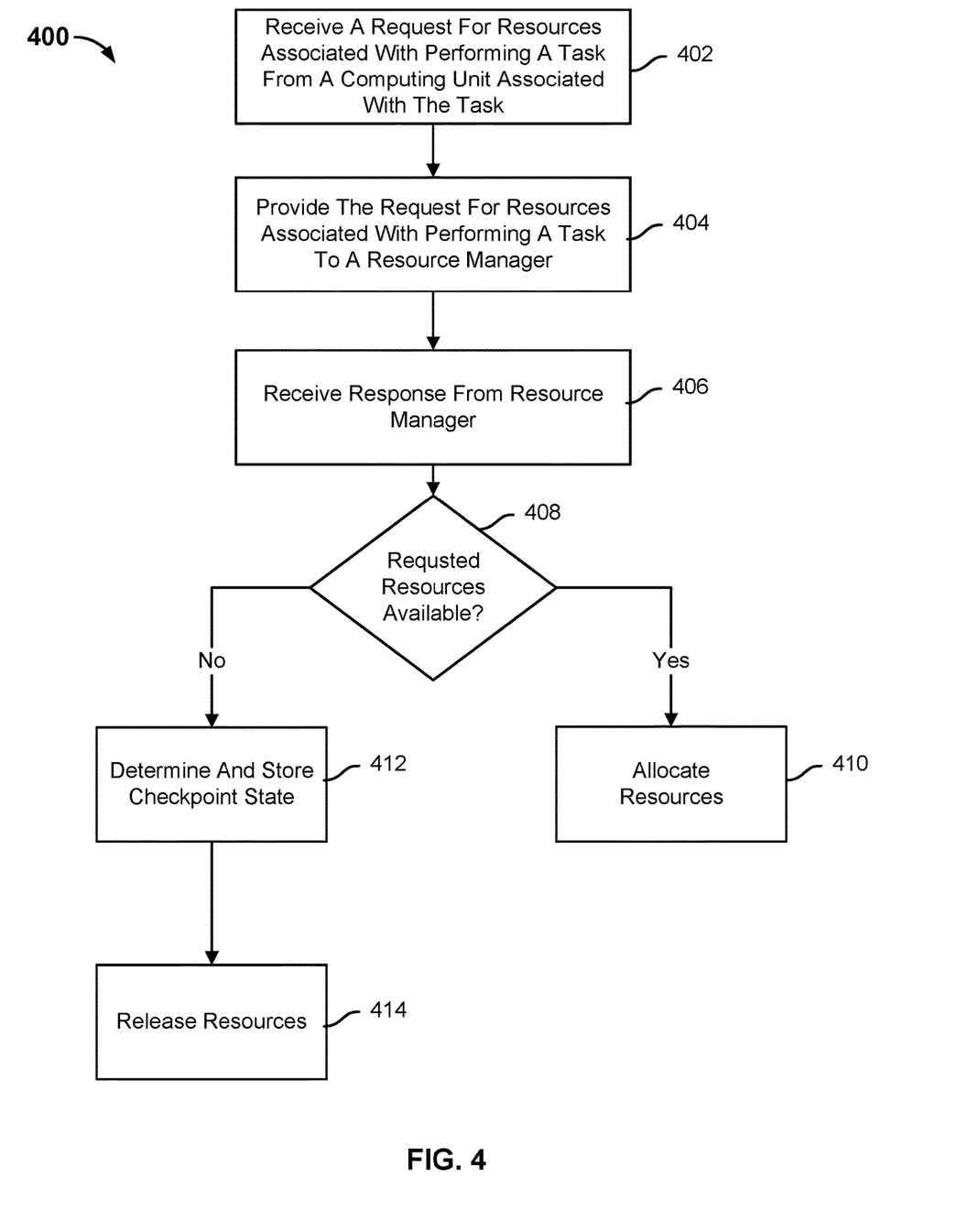
FIG. 4 is a flow diagram illustrating a process for dynamically allocating resources in accordance with some embodiments.

FIG. 4 is a flow diagram illustrating a process for dynamically allocating resources in accordance with some embodiments. In the example shown, process 400 may be implemented by a work queue service, such as work queue service 122. In some embodiments, process 400 is implemented to perform some of step 208 of process 200.

At 402, a request for resources associated with performing a task is received from a virtualization container associated with the task. In some embodiments, the virtualization container associated with the task requests an increase in the number of computing units to perform the task.

In some embodiments, the virtualization container associated with the task determines to divide the task into a plurality of sub-tasks. The request identifies the resource requirements for each of the plurality of sub-tasks. The requested resources may include compute resources, network resources, CPU resources, memory resources, external device CPU resources (e.g., slot resources) file system operation resources (e.g., resources reserved to store data in storage), etc. Each of the requested resources may have a corresponding QoS requirements.

At 404, the request for resources associated with performing the task is provided to a resource manager. The resource manager is configured to withhold resources for a particular task, such as the first task, until at least a minimum of the requested resources needed to make progress on the particular task are available. A threshold indicating the minimum required resources sufficient to make progress for a task may be manually or automatically configured or dynamically determined at the execution based on conditions at the time of execution. Partially allocating the requested resources for a particular task is a waste of time and resources because the virtualization container assigned to perform the particular task is unable to perform the task without at least a minimum of the requested resources needed to make progress on the particular task. Furthermore, one or more other tasks may be unable to be performed because the resources needed to perform the one or more other tasks have been partially allocated to the particular task.

At 406, a response is received from the resource manager. At 408, it is determined whether the response indicates whether the requested resources are available. In the event the response indicates the requested resources are available, process 400 proceeds to 410 where the requested resources are allocated for the task.

In the event the response indicates that the requested resources are not available, process 400 proceeds to 412. At 412, a checkpoint state is determined and stored for the task. At 414, resources associated with the task are released.

Figure 5:
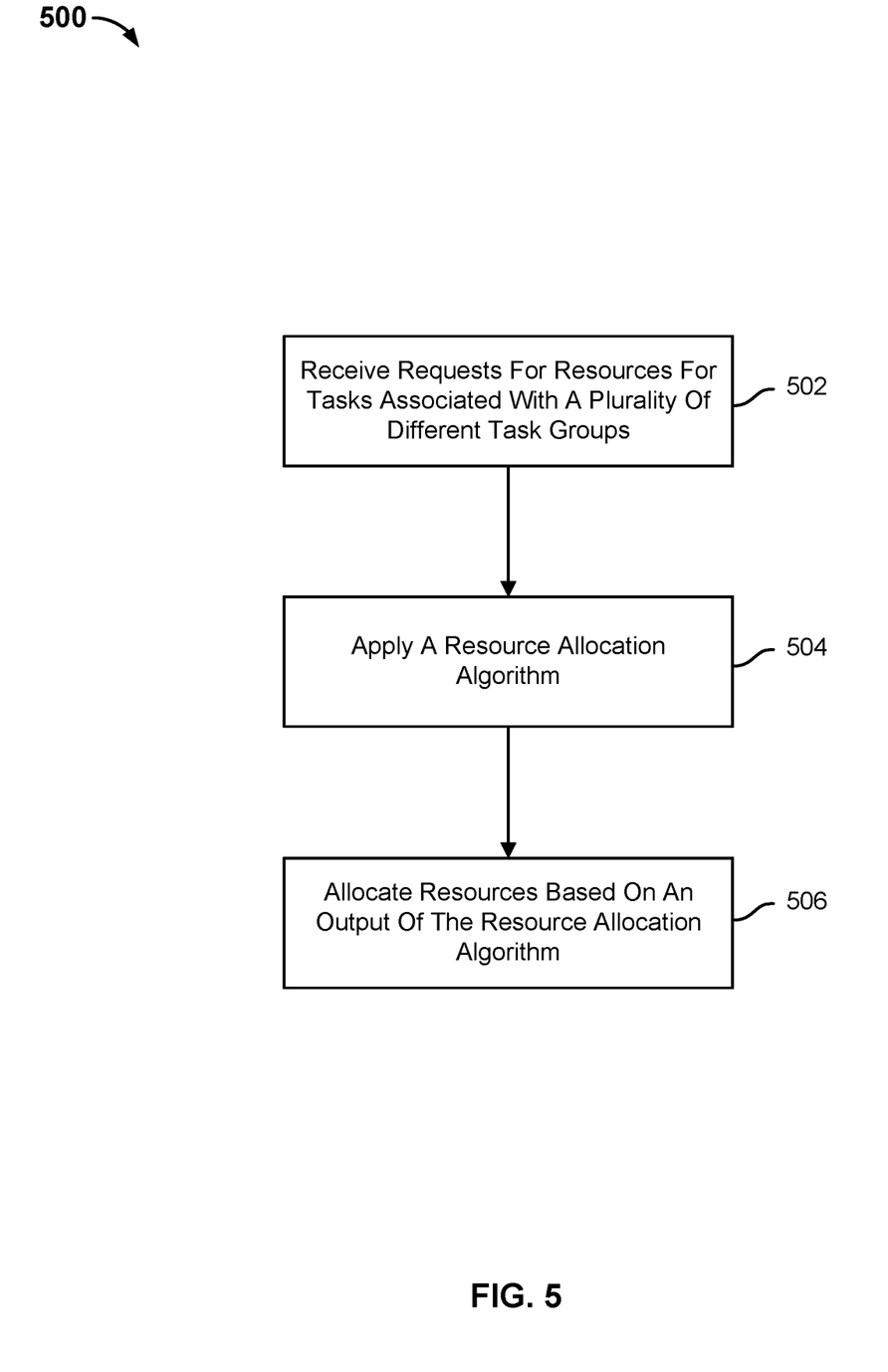
FIG. 5 is a flow diagram illustrating a process for dynamically allocating resources in accordance with some embodiments.

FIG. 5 is a flow diagram illustrating a process for dynamically allocating resources in accordance with some embodiments. In the example shown, process 500 may be implemented by a resource manager, such as resource manager 121. In some embodiments, process 500 is implemented to perform some of step 208 of process 200.

At 502, requests for resources for tasks associated with a plurality of different task groups are received. Each task group may be associated with a different storage service job. In some embodiments, each task group is associated with a different storage tenant.

At 504, a resource allocation algorithm is applied. In some embodiments, the resource manager allocates resources between tasks associated with the different task groups using a fairness algorithm. For example, a round-robin algorithm may be used. In some embodiments, the resource manager allocates resources between tasks associated with the different task groups using a weighted algorithm. For example, weights are assigned to the different task groups and resources are allocated between tasks associated with the different task groups based on the assigned weights.

At 506, resources are allocated based on an output of the resource allocation algorithm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving an indication of a storage service job to be performed, wherein the indication specifies:
      a task type associated with a task for the storage service job, and
      a task group for the storage service job, the task group comprising a logical, unordered group of two or more new tasks, wherein a first new task of the two or more new tasks comprises a snapshot task type, and wherein a second new task of the two or more new tasks comprises a data copy task type;
   adding the task to a work queue;
   dynamically managing execution of one or more tasks in the work queue that includes the task, including by dynamically allocating resources to one or more virtualization containers that are assigned to execute the one or more tasks in the work queue;
   dynamically determining, by one of the virtualization containers executing the task, an order in which the two or more new tasks of the task group specified in the indication are to be performed;
   receiving, from the one of the virtualization containers executing the task, an identification of the two or more new tasks to be performed for the storage service job and an indication of the order in which the two or more new tasks of the task group are to be performed; and
   adding the two or more new tasks to the work queue according to the order.

2. The method of claim 1, wherein the two or more new tasks are performed at least partially in parallel with the task.

3. The method of claim 1, wherein determining the task to be performed for the storage service job includes comparing the task type included in the indication to a mapping that associates a corresponding task type with a particular type of virtualization container.

4. The method of claim 1, further comprising deploying one or more computing units that include a corresponding virtualization container to perform the task.

5. The method of claim 4,
   wherein the corresponding virtualization container is associated with a container image specific to the task type associated with the task.

6. The method of claim 4, wherein the corresponding virtualization container is associated with a common container image that can be configured to perform different task types.

7. The method of claim 1, wherein dynamically managing execution of the one or more tasks in the work queue includes requesting resources for the one or more tasks from a resource manager.

8. The method of claim 7, wherein the requested resources include one or more of compute resources, network resources, CPU resources, memory resources, external device CPU resources, and/or file system operation resources.

9. The method of claim 7, wherein the resource manager allocates the requested resources for the task when at least a minimum of the requested resources needed to make progress on the task are available.

10. The method of claim 9, wherein the resource manager allocates resources between the task and one or more other tasks using a resource allocation algorithm.

11. The method of claim 1, wherein dynamically managing execution of one or more tasks in the work queue includes dividing the task into a plurality of sub-tasks.

12. The method of claim 11, wherein dividing the task into the plurality of sub-tasks includes requesting resources for each of the plurality of sub-tasks associated with the task.

13. The method of claim 12, wherein in the event the requested resources are unable to be allocated for at least some of the plurality of sub-tasks associated with the task, generating a checkpoint state for the task and releasing the resources allocated for the task.

14. The method of claim 11, wherein in the event the requested resources are able to be allocated for each of the plurality of sub-tasks associated with the task, generating a hierarchical task tree that maintains a relationship between the task and the plurality of sub-tasks associated with the task.

15. The method of claim 14, further comprising canceling the task.

16. The method of claim 15, further comprising utilizing the hierarchical task tree to release the resources allocated to the task and the plurality of sub-tasks associated with the task.

17. The method of claim 1, wherein the one of the virtualization containers executing the task identifies the two or more new tasks to be performed for the storage service job based on conditions associated with executing the task.

18. Non-transitory computer-readable storage media comprising instructions that, when executed by one or more processors, cause the one or more processors collectively to:
  receive an indication of a storage service job to be performed, wherein the indication specifies:
    a task type associated with a task for the storage service job, and
    a task group for the storage service job, the task group comprising a logical, unordered group of two or more new tasks, wherein a first new task of the two or more new tasks comprises a snapshot task type, and wherein a second new task of the two or more new tasks comprises a data copy task type;
  add the task to a work queue;
  dynamically manage execution of the one or more tasks in the work queue that includes the task, including by dynamically allocating resources to one or more virtualization containers that are assigned to execute the one or more tasks in the work queue;
  dynamically determine, by one of the virtualization containers executing the task, an order in which the two or more new tasks of the task group specified in the indication are to be performed;
  receive, from the one of the virtualization containers executing the task, an identification of the two or more new tasks to be performed for the storage service job and an indication of the order in which the two or more new tasks of the task group are to be performed; and
  add the two or more new tasks to the work queue according to the order.

19. A system, comprising:
one or more processors coupled to memory, the one or more processors and memory configured to collectively:
receive an indication of a storage service job to be performed, wherein the indication specifies:
  a task type associated with a task for the storage service job, and
  a task group for the storage service job, the task group comprising a logical, unordered group of two or more new tasks, wherein a first new task of the two or more new tasks comprises a snapshot task type, and wherein a second new task of the two or more new tasks comprises a data copy task type;
add the task to a work queue;
dynamically manage execution of the one or more tasks in the work queue that includes the task, including by dynamically allocating resources to one or more virtualization containers that are assigned to execute the one or more tasks in the work queue;
dynamically determine, by one of the virtualization containers executing the task, an order in which the two or more new tasks of the task group specified in the indication are to be performed;
receive, from the one of the virtualization containers executing the task, an identification of the two or more new tasks to be performed for the storage service job and an indication of the order in which the two or more new tasks of the task group are to be performed; and
add the two or more new tasks to the work queue according to the order.

* * * * *